United States Patent
Prakash et al.

(10) Patent No.: US 8,244,609 B2
(45) Date of Patent: Aug. 14, 2012

(54) PAYMENT MANAGEMENT ON MOBILE DEVICES

(75) Inventors: Gyan Prakash, Beaverton, OR (US); Saurabh Dadu, Tigard, OR (US); Selim Aissi, Beaverton, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 12/753,660

(22) Filed: Apr. 2, 2010

(65) Prior Publication Data

US 2011/0246373 A1  Oct. 6, 2011

(51) Int. Cl.
  *G07F 19/00* (2006.01)
(52) U.S. Cl. ........... 705/34; 705/30; 705/40; 709/203; 379/126; 455/406; 235/379
(58) Field of Classification Search ........... 705/34, 705/30, 40, 44, 64; 709/203, 206; 379/126; 455/406; 235/379, 380
  See application file for complete search history.

(56) References Cited

U.S. PATENT DOCUMENTS

| | | | |
|---|---|---|---|
| 2008/0006685 A1* | 1/2008 | Rackley, III et al. | 235/379 |
| 2008/0052233 A1* | 2/2008 | Fisher et al. | 705/40 |
| 2009/0157555 A1* | 6/2009 | Biffle et al. | 705/67 |
| 2009/0204523 A1* | 8/2009 | May et al. | 705/34 |
| 2009/0248475 A1* | 10/2009 | Choi et al. | 705/8 |
| 2010/0153227 A1* | 6/2010 | Medvinsky et al. | 705/26 |

* cited by examiner

*Primary Examiner* — Vanel Frenel
(74) *Attorney, Agent, or Firm* — Schwabe, Williamson & Wyatt, P.C.

(57) ABSTRACT

Embodiments of techniques and systems for asynchronous offline bill review and payment are described. A bill payment management module, operated on a manageability engine on a mobile device, communicates with an online bill payment service. The bill payment management module may receive information about bill payments, including bills which are due, and presents selective information to a bill payment client application. A bill payer can then access the information on the mobile device through the bill payment client application and review or change the payment amounts. The review and the modifications may be performed when the mobile device is offline and the modifications may be stored until a later time when the mobile device can connect to a network. Once a network is available, the bill payment management module may send payment instructions to the online bill payment service. Other embodiments may be described and claimed.

21 Claims, 6 Drawing Sheets

Mobile Bill Payment System

Fig. 3

| Online Payment Service | Sept. 2009 Payment | Oct. 2009 Payment | Nov. 2009 Current Bill |
|---|---|---|---|
| Electric Utility | 110.00 | 120.00 | 150.00 |
| Phone Company | 120.00 | 200.00 | 350.00 |
| Water Utility | 70.00 | 65.00 | 79.00 |
| Bank Credit Card | 1200.00 | 900.00 | 2557.00 |
| Online Movie Service | 25.00 | 45.00 | 99.00 |
| Natural Gas Utility | 180.00 | 220.00 | 350.00 |
| Total | 1705.00 | 1550.00 | 3585.00 |
| Total Balance as of Nov. 5th, 2009 is $7300.00 | | | Hide/Display |
| Cancel | Remind Again | Edit | Submit |

310 → Sept. 2009 Payment
320 → Oct. 2009 Payment
330 → Nov. 2009 Current Bill
340
350 Hide/Display
360 Cancel
370 Remind Again
380 Edit
390 Submit

PAYMENT MANAGEMENT ON MOBILE DEVICES

TECHNICAL FIELD

This application relates to the field of mobile communications, and in particular, to providing secure offline review of financial data on a mobile device.

BACKGROUND

In recent years, personal online financial services have proliferated. Among these are payment services, such as those offered by banks or other financial institutions to automate reporting and payment of bills. Typically, using a personal computer, a bill payer may use such a service to receive information about bills for which that payer is responsible—such information may include minimum payment amounts, due dates, and identifiers of the particular entity to which the payer owes money, such as a utility or a credit card provider. In some systems, using a personal computer, the bill payer is able to review the information and then to direct payment of bills due. The payer may wish to modify or edit payment terms, such as a payment amount, a date that the payment is to be posted, or a source of the funds used to pay the bill. Some online bill payment systems utilize email-based notifications of new bills and upcoming payments. Other systems may use web-based interfaces to allow access to bill information and to provide payment instructions.

BRIEF DESCRIPTION OF THE DRAWINGS

Embodiments of the present disclosure will be described by way of exemplary embodiments, but not limitations, illustrated in the accompanying drawings in which like references denote similar elements, and in which:

FIG. 3 is an example interface for viewing and modifying bill payment information in accordance with various embodiments;

BRIEF DESCRIPTION OF TECHNOLOGY

Figure 1:
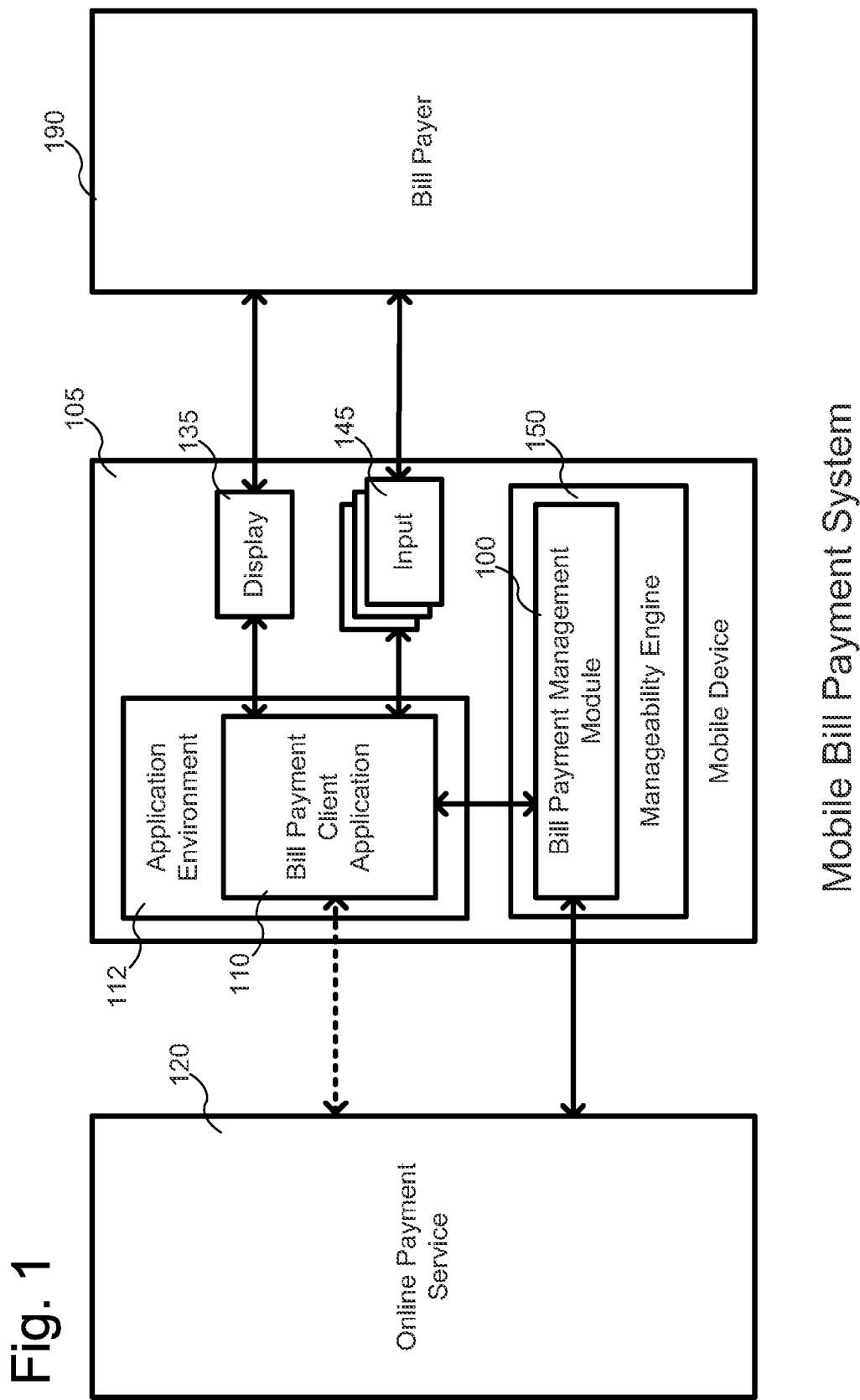
FIG. 1 is a high-level block diagram illustrating relationships between entities in a mobile bill payment system in accordance with various embodiments of the present disclosure.

Illustrative embodiments of the present disclosures include, but are not limited to, apparatuses and methods which overcome weaknesses and disadvantages of existing online bill payment techniques in the context of mobile devices by providing review of bill payment information and provision of payment instructions from a bill payer on a mobile device in an asynchronous, offline manner. The mobile device may utilize a secure, firmware-based bill payment (BP) management module, which may be operated in a manageability engine of the mobile device. In various embodiments, the BP management module may securely communicate with an online payment service (e.g., a bank or credit card) to receive bill information, and send payment instructions. The BP management module may, in various embodiments, store and maintain bill information and/or payment instructions on the mobile device, such that the information may be reviewed and modified even when no network connection is available to the device. This allows for offline, asynchronous review of payments without requiring repeated logins to the online payment system.

Embodiments of the system may also include a software-based client application, executing in an application environment separate from the manageability engine, that provides, among other things, a user-facing front end. This client application may thus allow a user to see the bill information (after authentication). The client application may also allow a user to make changes to the information before payment. In various embodiments, the BP management module may communicate in an encrypted manner with the online bill payment service without allowing the client application direct access to financial information, such as account information, transmitted between the BP management module and the BP service. In various embodiments this may be done as a direct network connection between the BP service and the BP management module, or by using the BP client software as a relay for encrypted data.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

FIG. 1 is a block diagram illustrating relationships and communication between entitles involved in a mobile BP system according to various embodiments of the present disclosure. As illustrated, in various embodiments a bill payer 190 may utilize an online BP service 120 through his or her mobile device 105. The mobile device 105, in various embodiments, may contain a BP management module 100, which may communicate with the online BP service 120 to receive bill payment information and provide payment instructions to the online payment service 120. In various embodiments, and as described below, the BP management module may operate on a manageability engine 150 ("ME").

In various embodiments, the system may also comprise a BP client application 110. In various embodiments, this BP client application may operate in an application environment on the mobile device, such as the illustrated application environment 112 that is separate and independent of ME 150. The BP client application 110 may receive financial information entirely, or in part, from the BP management module 100. This BP client application 110 may then communicate, using a display 135 and one or more input facilities 145 (such as, for example, a touch screen, a keyboard, or voice control) with the bill payer 190. In some embodiments, the illustrated separation between the online BP service 120 and the BP client application 110 may allow for increased security than solely utilizing software applications for accessing payment information. Because the BP management module 100 operates inside the manageability engine 150, and is therefore separate from the application environment 112 where the BP client application 110 resides, it may provide a more secure repository for sensitive financial information such as account numbers, passwords, and payment histories than the client application 110, and it may selectively display only desired information to the bill payer by making it available to the client application. In alternative embodiments, the client application may communicate with the online payment service in a limited fashion, as illustrated by the illustrated dashed communication arrow. For example, the BP client application 110 may serve as a relay for encrypted communications between the online BP service 120 and the BP management module 100. In such an embodiment, the BP client application 110 may not be permitted to directly access the encrypted information it relays, and may rely upon the BP management module 100 to provide bill payment information for display and editing.

Figure 2:
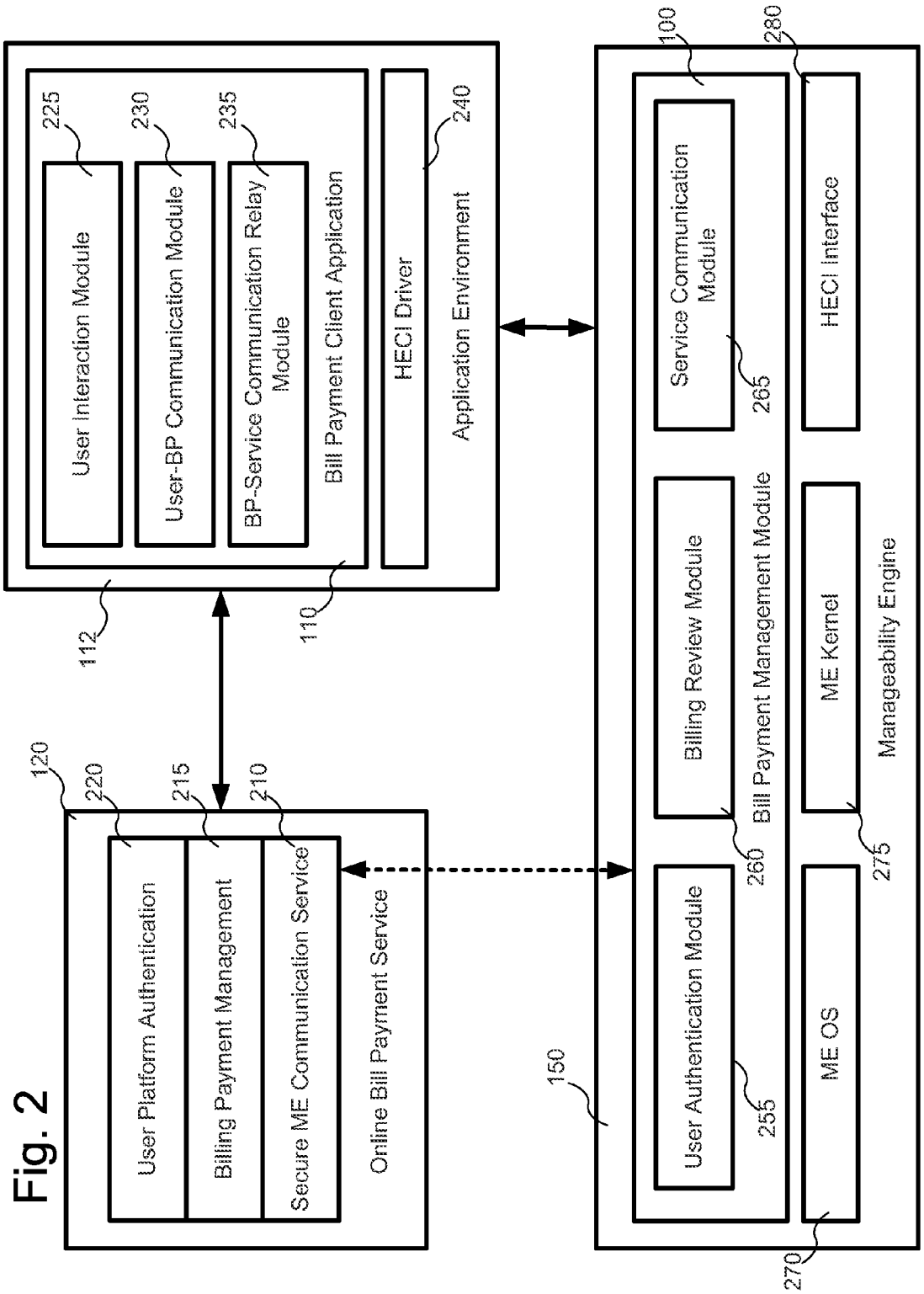
FIG. 2 is a block diagram illustrating internal components of the bill payment system in accordance with various embodiments.

FIG. 2 is a block diagram illustrating entities which may be found in the online BP service 120, the BP client application 110 (executing the application environment 112), and the BP management module 100 (executing in the manageability engine 150). While the illustrated embodiments show specific groupings and divisions of various software and firmware modules, it may be recognized that, in alternative embodiments, the modules may be merged, broken apart, or removed altogether.

The online BP service 120, which may comprise a server (not illustrated) comprises various modules. Next, the online BP service may comprise a secure management engine communication service module 210. In various embodiments, this module may encrypt information which is to be sent to the BP management module 100 in the ME and decrypt information sent from the BP management module 100. As discussed above, in various embodiments, the secure ME communication service 210 may perform this communication through the use of a relay in the BP client application 110. In other embodiments, the secure ME communication service 210 may communicate directly to the BP management module 100, such as over a 3G network, which may provide for such direct access without the use of an intermediary.

The online BP service 120 also may comprise a BP management module 215. In various embodiments, the BP management module 215 may serve as a peer of billing review and modification modules on the mobile device, and thus may allow a bill payer to monitor, review, and update payment transaction details. In various embodiments, the BP management module 215 may also help provision the mobile device with the various software and firmware modules used for the mobile BP techniques described herein, including provisioning cryptography secrets in the ME firmware modules and helping the bill payer set up secure passwords. The online BP service 120 may also comprise a user platform authentication module 220, which can provide authentication of various bill payers using the online BP service to various financial entities.

The BP client application 110 may also comprise, in various embodiments, various modules; as discussed above, these modules may be implemented in software and execute in an application environment 112 on a CPU of the mobile device. As discussed below, in some embodiments, the BP client application 110 may be executed on a processor dedicated to the application environment 110, with a different processor employed to operate ME 150. The BP client application 110, in various embodiments, may comprise a user interaction module 225 which provides information to a bill payer, such as bill payment history, bills due, and payment amounts. In various embodiments, the user interaction module 225 may also allow a bill payer to edit proposed payment amounts (such as to increase a payment past the minimum due) or to enter in new payments if one has not been pre-set. As discussed above, the user interaction module 225 may interact with a bill payer through one or more displays and/or input devices.

Additionally, in various embodiments, bill payer interaction may not be performed solely through the user interaction module 225. For instance, a bill payer, when desiring to see his or her bill payment information, may enter a password through a textbox or other input facility that is provided directly to the bill payer by a portion of the BP management module 100. This may be done with the assistance of the BP management module 100, which may send messages directly to the display and receive text input without software, such as the client application otherwise having access to the transmitted information. This direct communication may provide added security for a bill payer, who may not want his or her passwords or other information to be accessible by the user interaction module 225 or other software. In various embodiments, the illustrated user BP communication module 230 may periodically communicate with the BP management module 100 to determine whether any bill payment information updates have been received by the BP management module 100 from the online BP service 120, and may alert the user that new information is ready to be received, after the user authenticates his or her identity.

The BP client application 110 also may comprise an BP-Service communication relay module 235. As discussed above, in various embodiments, this module may serve as a relay in which encrypted communications between the online BP service 120 and the BP management module 100 are sent without access by the software-based BP client application 110. In alternative embodiments, this module may not be used by every communication between the online BP service 120 and the BP management module 100 in the ME 150, or may not be used at all. In various embodiments, communications between the BP management module 100 and the BP client application 110 may be facilitated by the Host Embedded Controller Interface ("HECI") Driver 240, executing in the application environment 112, as may be understood.

FIG. 2 also illustrates the BP management module 100, which may execute in firmware on the management engine 150. For the purposes of discussion the ME will be assumed to comprise one or more firmware modules which provide support for management applications, such as the BP management module 100 to run in firmware. The ME, in various embodiments, may allow these management modules to execute on a micro controller other than a CPU, such as in a graphics and memory controller hub. In various embodiments, the ME may execute on auxiliary power and be available at more power states than the CPU—this availability can provide increased opportunities for the BP management module 100 to receive bill payment information and send bill payment instructions when the mobile device is otherwise offline. In various embodiments, the ME may also provide direct access to network communications and communications with input and output devices, as described above. In various embodiments, the ME may utilize the HECI interface 280 for these communications, as well as the ME operating system (OS) 270 and ME kernel 275, as may be understood. ME OS 270 and ME kernel 275 may be implemented in accordance with any one of a number of ME OS and ME kernel known in the art.

The BP management module 100 may comprise a user authentication module 255 which, in various embodiments, may facilitate a bill payer in authenticating their identity before presenting sensitive financial information to the bill payer, such as through the BP client application 110. In alternative embodiments, user authentication may be performed at least in part through the client application, rather than by the BP management module in the ME. The BP management module 100 may also comprise a billing review module 260, which may provide billing information to a bill payer, as well as receive payment instructions from the bill payer, including edits or modifications the bill payer may provide. In various embodiments, the billing review module 260 may transmit these edits to the online BP service 120 so that the payments may be made by the service. As such, in various embodiments, the billing review module may have access to and/or maintain sensitive financial information, such as account numbers, passwords, billing history, minimum payment amounts, and the like. The billing review module 260 may also selectively provide some or all of this information to the BP client application for presentation to the user, for instance after authentication of the user by the user authentication module 255. The information which is selectively provided for user review may be chosen so as to avoid the inadvertent sharing of sensitive financial information.

Further, the BP management module may comprise a server communication module 265 which is configured to communicate with the online BP service 120. For instance, as described above, the service communication module 265 may provide for encrypted communications with the online BP service 120. In some embodiment this may be done using the BP client application as a relay, in other embodiments, the service communication module 265 may communicate directly with the online BP service. In various embodiments, while the server communication module 265 relies on a network connection to communicate with the online BP service, the user authentication module 255 and the billing review module 260 may be configured to operate while the mobile device does not have network connectivity. This configuration may allow a user to review and make modifications to payment details even when the mobile device is offline.

FIG. 3 illustrates one example of a user interface which may be presented to a bill payer for review. As discussed above, in various embodiments the interface illustrated in FIG. 3 may be provided by the user interaction module 225 using information received by the billing review module 260. In the illustrated example, columns 310 and 320 show, for each of various utilities and other creditors, amounts that were previously paid by the bill payer. Thus, in September 2009, the bill payer paid $180.00 to his or her natural gas utility. As in the illustrated example, in various embodiments the system may display the past paid amounts with shading or another indicator that they represent history.

The user interface may also present payments which are due, such as the amounts illustrated in column 330. In this example, the column 330 is pre-populated with outstanding amounts, such as in element 340; these amounts may, in some embodiments, come from communications by the online BP service 120 with various creditor institutions. For example the user interface may pre-populate the due amounts according to a minimum payment which must be paid according to a financial institution. In some embodiments, the due amounts may also be displayed alongside due dates. In some embodiments, no amount may be pre-populated in the user interface, and the user interface may provide a facility for allowing the bill payer to enter an arbitrary amount. The user interface may also display other financial information, such as totals paid, totals owed, or totals due. In various embodiments, the user interface may omit sensitive financial data, such as account numbers or passwords, or even identifiers such as bank or service names. This may help avoid identity theft in case the mobile device falls into the wrong hands or a user other than the bill payer views the screen.

As illustrated in the user interface of FIG. 3, various elements of the user interface may be interacted with by a bill payer. In the illustration, some elements which may be so interacted are underlined. Thus, for example, each of the pre-populated dollar amounts may be clicked on, pointed to, or otherwise selected, by the bill payer, and changed. The user interface also provides for other interactions. For example, a bill payer may choose to hide or display amounts, such as by selecting element 350, to cancel any changes made to the payment amounts (element 360), to request a later reminder to provide BP instructions (element 370), to enter an editing mode (element 380), and to submit the payment instructions, including uncancelled edits, to the online BP service (element 390). In various alternative embodiments, various illustrated elements may be omitted and other elements may be added.

Figure 4:
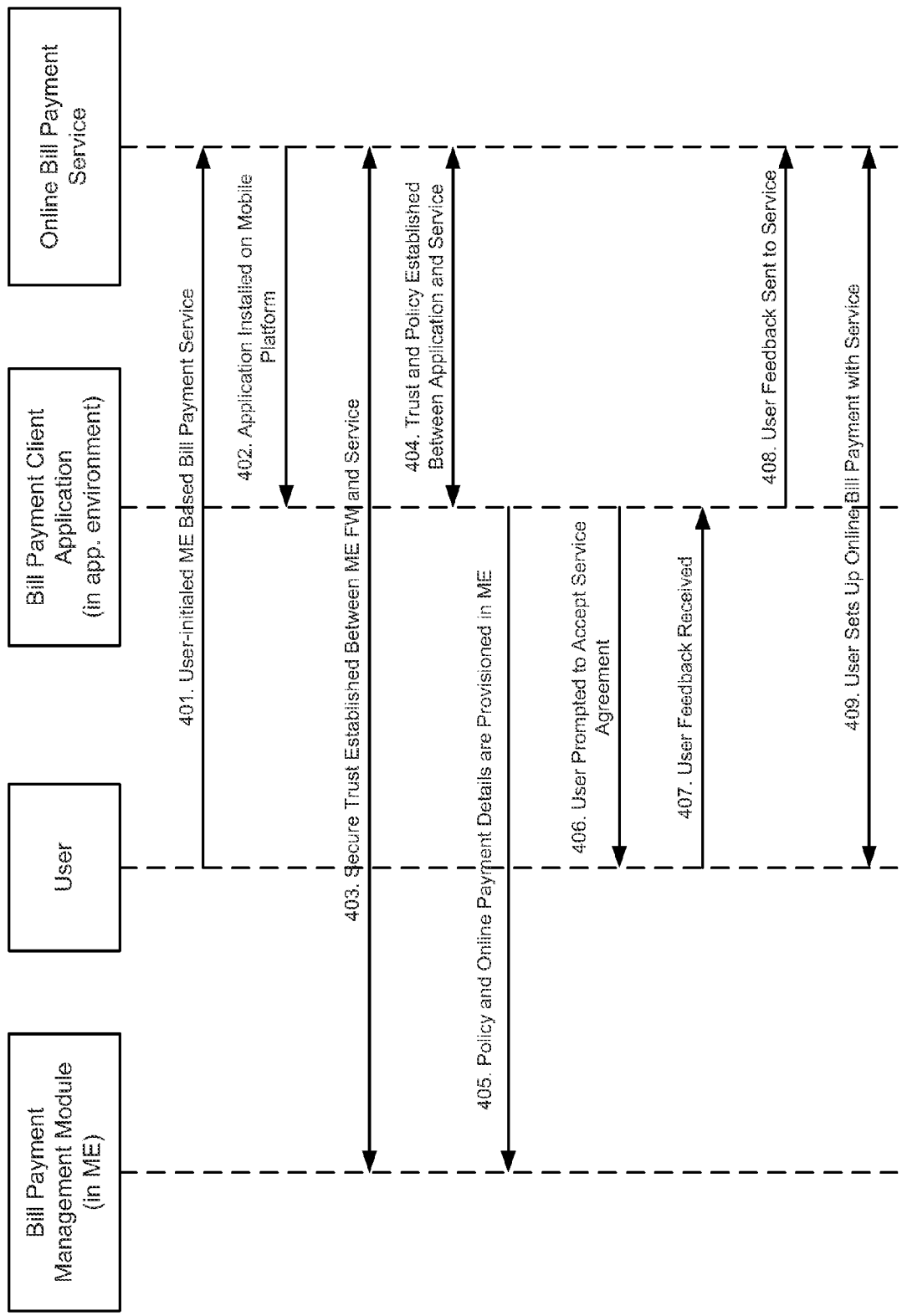
FIG. 4 illustrates a mobile bill payment setup process in accordance with various embodiments.

FIG. 4 illustrates an example process for setting up mobile bill payments employing embodiments described herein. As illustrated, the process involves communications between the BP management module 110 executing on the ME 150, a user, such as the bill payer 190, the BP client application 110 executing the application environment 112, and the online BP service 120. The process may begin at action 401, where the user communicates with the online payment service to initiate setup of the ME-based BP service. Next, at action 402, the online BP service installs an application on the mobile platform. In various embodiments, this may also comprise installation of the BP management module in the ME. Next, at action 403, the BP management module and the online BP service establish trust between each other. In various embodiments, this action may comprise the exchange of one or more encryption keys and/or signed certificates to provide and maintain trust. Each of the actions may comprise one or more operations.

Next, at action 404, the BP client application and the online BP service also establish trust and exchange policy information. In various embodiments, policy information may include payment-based policies such as whether users are allowed to change amounts, by whom payments may be made, and/or how pre-determined amounts are computed. Next, at action 405, policy and online payment details are provisioned in the BP management module. In various embodiments, these details may be passed through, such as in encrypted form, from the policies previously established at action 4.

Next, at action 406, the user may be prompted to accept a service agreement to use the mobile BP system, such as being requested to agree with a statement of the agreement by the BP client application. At action 407, the user provides feedback, such as by agreeing to the service agreement. At action 408, the feedback is sent to the online BP service, allowing the user to begin to set up accounts with the service. Then at action 409, the user sets up his or her payment accounts with the online BP service. In various embodiments, the BP management module may provide a facility for setting up accounts with the online BP service; in other embodiments, the BP management module may not provide such a facility, and may receive bill account information directly from the online BP service.

Figure 5:
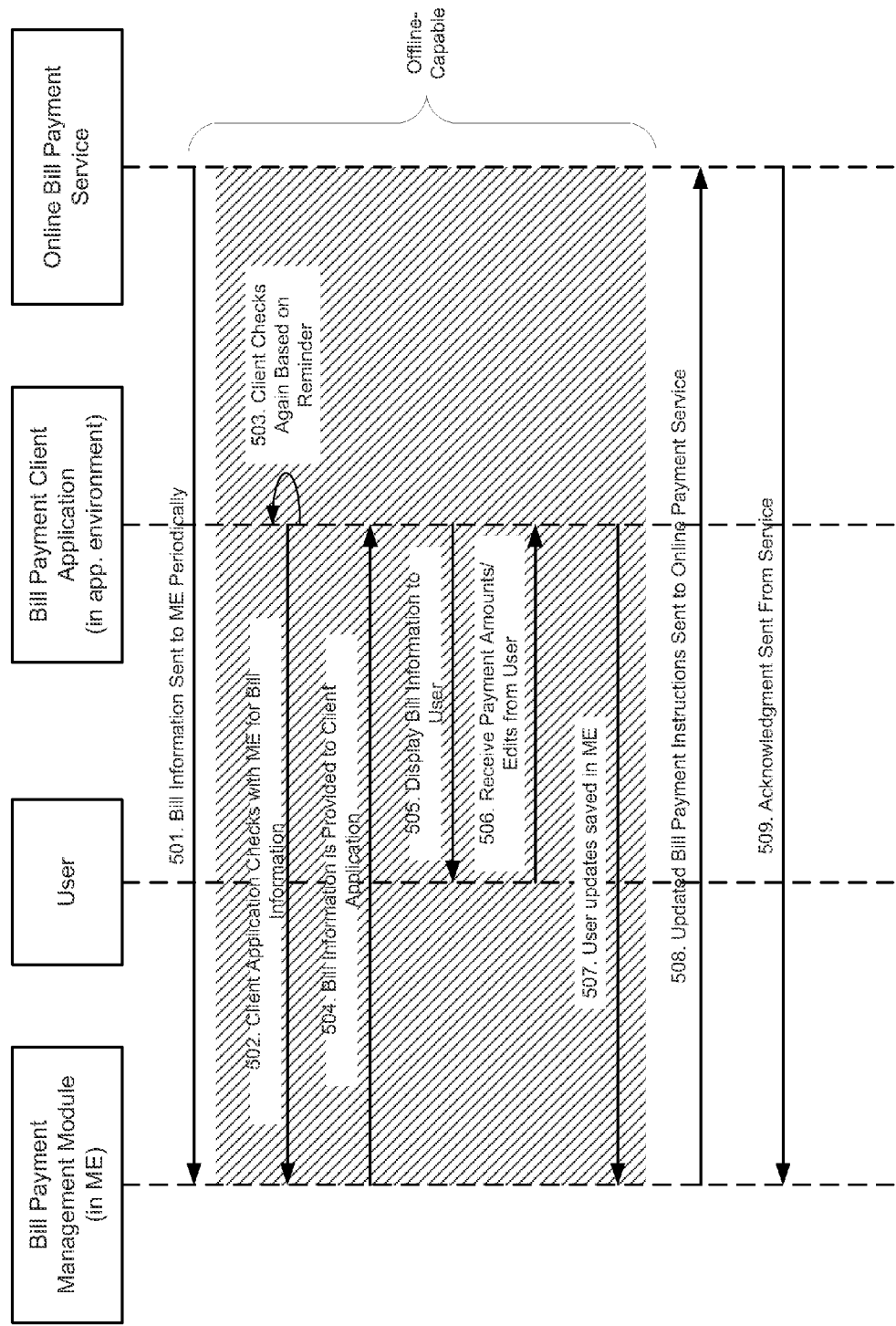
FIG. 5 illustrates a mobile bill payment review and instruction process in accordance with various embodiments.

FIG. 5 illustrates an example process for setting up mobile bill payments employing embodiments described herein. As illustrated, the process involves communications between the BP management module 110 executing on the ME 150, a user, such as the bill payer 190, the BP client application 110 executing in the application environment 112, and the online BP service 120. The process begins at action 501, where information detailing bills and/or bill payments which are due may be sent to the BP management module 110 on the ME 150. In various implementations, this information may be sent periodically, such as in response to the BP management module 110 periodically requesting new bill payment information from the online BP service 120. In some implementations, the bill payment information may be sent directly to the BP management module 110 from the online BP service 120 rather than in response to a request. In various implementations, the bill information sent to the ME 150 may be encrypted prior to being sent, and may be then decrypted by the BP management module 110 after receipt.

As discussed above, actions 502-507, may, in some embodiments, be performed even when the mobile device on which the BP management module 100 and the BP client application 110 are executing is not connected to a network. This portion of the process is illustrated by the area with the slashed lines. Thus, at action 502, the BP client application 110 may check with the BP management module 100 in the ME 150 for new or updated bill payment information, regardless of whether the mobile device is currently connected to a network. As with the checking discussed above, this may be done periodically, or may result from a message sent from the ME 150 to the BP client application 110 indicating that new information has been received. At action 503, the BP client application 110 may check again, such as if a bill payer indicates that he or she should be reminded later about a bill. In response to the check, the BP management module 100 in the ME 150 may provide the bill information to the BP client application 110 at action 504.

Next, at action 505, the BP client application 110 may display the bill information received from the BP management module 100 to the user. As discussed above, this display may be of a selective subset of the information known to the BP management module 100, for security purposes. Then, at action 506, the user may provide payment amounts (and/or edits to provided payment amounts) to the BP client application 120. As discussed above, this may be performed using the user interaction module 225 of the BP client application 110, such as with a user interface like that illustrated in FIG. 3. Next, at action 507, updates which have been received from the user may be saved by the BP management module 100 in the ME 150. In various implementations, the updates may be sent directly to the BP management module 100 and then saved by the BP management module 100 in storage available to the ME 150. In alternative embodiments, the updates may be stored by the BP client application 110 in storage that is accessible to both the application environment 112 and the ME 150. In this case, the BP client application 110 may send to BP management module 100 an indication that a change has occurred so that the BP management module 100 can retrieve the updates.

After receiving the updates, at action 508 the BP management module 100 may send updated bill payment instructions to the online BP service 120. As discussed above, this transmission of the updated instructions may be sent directly by the BP management module 100 in the ME 150 to the online BP service 120, or may be sent using the BP client application 110 as a relaying intermediary. In various implementations, the BP instructions may be encrypted by the BP management module 100 prior to being sent, and may be then decrypted by the online BP service 120 after receipt. Then, at action 509, the online BP service 120 may send an acknowledgment to the BP management module 100 that the updated instructions were received. The online BP service 120 may proceed with executing the payment instructions.

Figure 6:
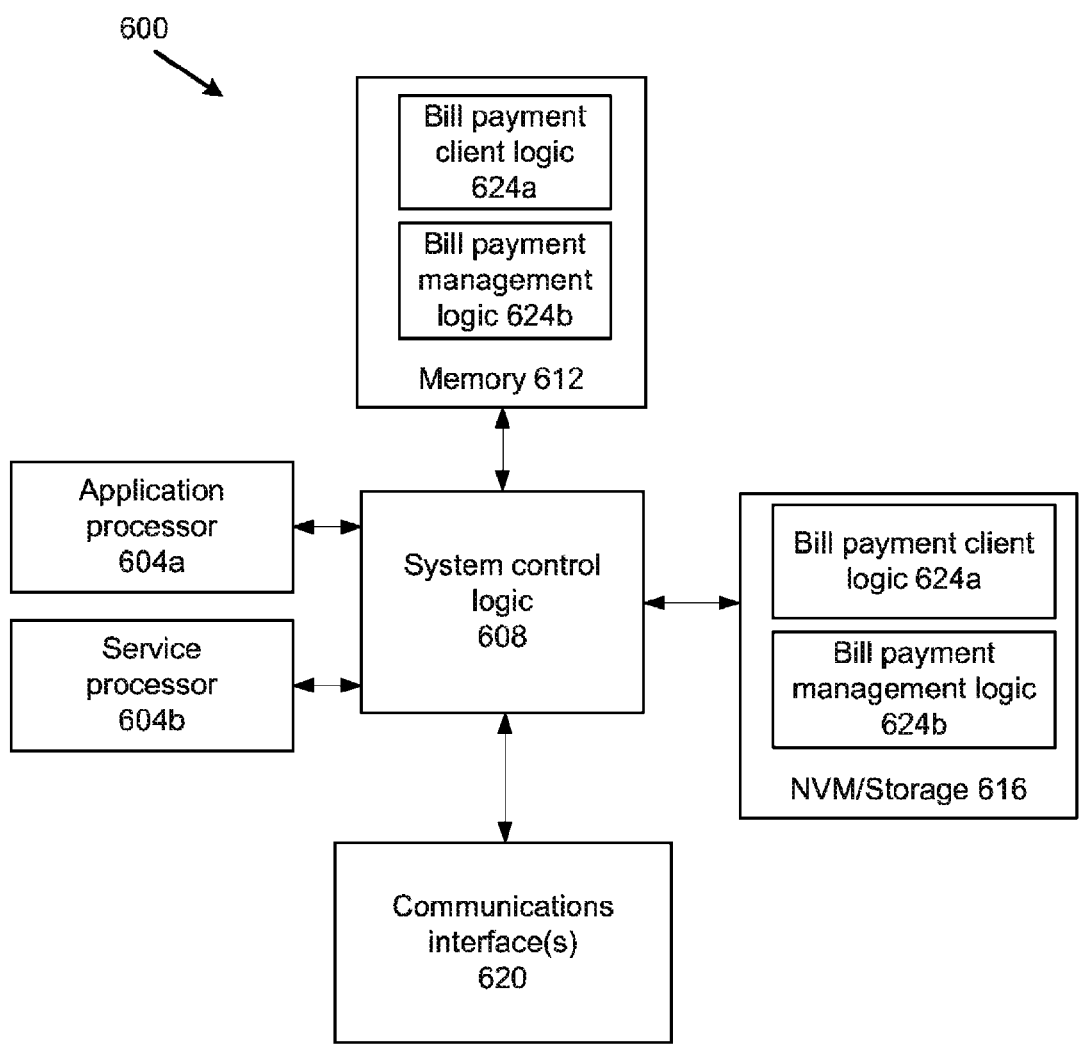
FIG. 6 is an example computing environment in accordance with various embodiments.

The techniques and apparatuses described herein may be implemented into a system using suitable hardware, firmware, and/or software to configure as desired. FIG. 6 illustrates, for one embodiment, an example system 600 comprising at least processor 604a and 604b, system control logic 608 coupled to at least one of the processors 604a and 604b, memory 612 coupled to system control logic 608, non-volatile memory (NVM)/storage 616 coupled to system control logic 608, and one or more communications interface(s) 620 coupled to system control logic 608. In various embodiments, the system 600 may comprise components of a CPU-based software system, a management engine system, or a combination of the two.

System control logic 608 for one embodiment may include any suitable interface controllers to provide for any suitable interface to at least one of the processors 604a and 604b and/or to any suitable device or component in communication with system control logic 608. The processors may comprise a dedicated application processor 604a, upon which an application environment may be operated, as well as a separate service processor 604b, upon which a manageability engine may be operated. The system may comprise additional processors or processing cores (not illustrated).

System control logic 608 for one embodiment may include one or more memory controller(s) to provide an interface to memory 612. System memory 612 may be used to load and store data and/or instructions, for example, for system 600. System memory 612 for one embodiment may include any suitable volatile memory, such as suitable dynamic random access memory (DRAM), for example.

System control logic 608 for one embodiment may include one or more input/output (I/O) controller(s) to provide an interface to NVM/storage 616 and communications interface (s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) (HDD (s)), one or more solid-state drive(s), one or more compact disc (CD) drive(s), and/or one or more digital versatile disc (DVD) drive(s) for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

Memory 612 and NVM/storage 616 may include, in particular, temporal and persistent copies of BP logic, respectively. In the illustrated example, this logic includes both bill payment client logic 624a and bill payment management logic 624b. The bill payment client logic 624a and bill payment management logic 624b may include instructions that, when executed by at least one of the processors 604a and 604b, result in the system 600 performing bill information review and bill payment instruction operations as described in conjunction with either of the modules described herein. In some embodiments, one or both of the BP client logic 624a and BP management logic 624b may additionally/alternatively be located in the system control logic 608.

Communications interface(s) 620 may provide an interface for system 600 to communicate over one or more network(s) and/or with any other suitable device. Communications interface(s) 620 may include any suitable hardware and/or firmware. Communications interface(s) 620 for one embodiment may include, for example, a network adapter, a wireless network adapter, a telephone modem, and/or a wireless modem. For wireless communications, communications interface(s) 620 for one embodiment may use one or more antenna(s).

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, system 600 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A computer-implemented method, comprising:
    at a mobile client computing device, automatically receiving via a network and storing on behalf of a bill payer, by a manageability engine (ME) of the mobile client computing device, information from an online bill payment service describing past bill payments or bills with payments due for the bill payer, without intervention of the bill payer, if the mobile client computing device is coupled to the network, wherein a first processor of the mobile client computing device operates the ME independent of a second processor of the mobile client computing device that operates an application environment of the mobile client computing device, wherein the first and second processors are different processors;
    at the mobile client computing device, receiving one or more payment instructions from a user via the application environment to make one or more payments for one or more bills, independent of whether the mobile client computing device is coupled to the network;
    at the mobile client computing device, storing the received payment instructions independent of whether the mobile client computing device is coupled to the network; and
    at the mobile client computing device, if the mobile client computing device is coupled to the online bill payment service via the network, sending by the ME, the payment instructions to the online bill payment service to cause the one or more payments to be made.

2. The method of claim 1, further comprising at the mobile client computing device, displaying the past bill payments or bills with payments due.

3. The method of claim 2, further comprising:
    at the mobile client computing device, authenticating an identity of the user before displaying the past bill payment or bills with payments due, receiving the payment instructions, storing the payment instructions, or sending the payment instructions.

4. The method of claim 1, wherein:
    said receiving information includes:
        at the mobile client computing device, receiving by the ME encrypted information from the online bill payment service; and
        at the mobile client computing device, decrypting by the ME the encrypted information; or
    said sending the payment instructions to the online bill payment service includes:
        at the mobile client computing device, encrypting by the ME the payment instructions to produce encrypted payment instructions; and
        at the mobile client computing device, sending by the ME the encrypted payment instructions to the online bill payment service.

5. The method of claim 4, wherein said receiving encrypted information from the online bill payment service includes, at the mobile client computing device, receiving encrypted information by the ME from the online bill payment service without a client application executed by the second processor accessing the information in unencrypted form.

6. The method of claim 4, wherein said sending the encrypted payment instructions to the online bill payment service includes, at the mobile client computing device, sending, by the ME, encrypted payment instructions to the online bill payment service without a client application executed by the second processor accessing the information in unencrypted form.

7. The method of claim 1, further comprising, at the mobile client computing device, automatically checking with the online bill payment service, by the ME, for updates to the information, without intervention of the bill payer, if the mobile client computing device is coupled to the network.

8. The method of claim 1, wherein said receiving information includes, at the mobile client computing device, receiving the information from the online bill payment service if the mobile client computing device is coupled to the network, without sending a request for the information to the online bill payment service.

9. An apparatus, comprising:
    a mobile client computing device that includes:
        a plurality of computer processors;

a networking interface coupled to the computer processors;

a manageability engine (ME) configured to be operated by a first of the computer processors independent of an application environment operated by a second of the computer processors, wherein the first and second processors are different processors;

a bill payment management module configured to be operated by the ME to enable the mobile client computing device, in response to operation of the bill payment management module, to:

receive information describing past bill payments or bills with payments due associated with a bill payer from an online bill payment server via the networking interface without intervention of the bill payer and without a software-based client bill payment application on the mobile client computing device having access to the information; and transmit received payment instructions to the online bill payment server via the network interface without the software-based client bill payment application having access to the payment instructions; and the software-based client bill payment application configured to be operated by the second of the processors to enable the mobile client computing device, in response to the operation of the software-based client bill payment application, to:

present the past bill payments or bills with payments due; and receive payment instructions to make one or more payments for one or more bills.

10. The apparatus of claim 9, further comprising storage coupled to the computer processors and configured to store the bill payment instructions in the storage.

11. The apparatus of claim 9, wherein the software-based client bill payment application is further configured to present information, and receive payment instructions, independent of whether the networking interface is coupled to a network.

12. The apparatus of claim 9, wherein the bill payment management module includes a server communication module operated by the ME that is configured to decrypt encrypted information describing past bill payments or bills with payments due received from the online bill payment server and encrypt bill payment instructions before transmitting them to the online bill payment server.

13. The apparatus of claim 12, wherein the bill payment management module further includes a billing review module operated by the ME that is configured to provide decrypted information to the software-based client bill payment application to present to the bill payer.

14. The apparatus of claim 13, wherein the bill payment management module further includes a user authentication module operated by the ME that is configured to authenticate the bill payer's identity before providing information to the software-based client bill payment application.

15. The apparatus of claim 12, wherein the software-based client bill payment application further includes a server communication relay module that is configured to relay encrypted information between the bill payment management module in the ME and the online bill payment server.

16. The apparatus of claim 12, wherein the bill payment management module is further configured to communicate directly with the online bill payment server via the ME independent of the software-based client bill payment application.

17. One or more non-transitory computer-readable storage media containing instructions which, in response to execution by a mobile client computing device, cause the mobile client computing device having a plurality of processors to perform operations including:

automatically receiving via a network and storing on behalf of a bill payer, by a manageability engine (ME) of the mobile client computing device, information describing past bill payments or bills with payments due for the bill payer from an online payment service, without intervention of the bill payer, if the mobile client computing device is coupled to the network, wherein the ME is configured to operated by a first of the processors independent of an application environment operated by a second of the processors;

receiving or retrieving one or more payment instructions, by the ME, to make one or more payments for one or more bills, independent of whether the mobile client computing device is coupled to the network; and if the mobile client computing device is coupled to the online bill payment service via the network, sending, by the ME, the payment instructions to the online bill payment service to cause one or more payments to be made.

18. The non-transitory storage media of claim 17, wherein the operations further include authenticating the bill payer's identity before permitting displaying the past bill payments or bills with payments due, receiving the payment instructions, or storing the payment instructions by a bill payment client application operating in the application environment.

19. The non-transitory storage media of claim 17, wherein the operations further include:

receiving, by the ME, encrypted information from the online bill payment service; and decrypting, by the ME, the encrypted information; or encrypting, by the ME, the payment instructions to produce encrypted payment instructions; and sending, by the ME, the encrypted payment instructions to the online bill payment service.

20. The non-transitory storage media of claim 19, wherein the operations further include receiving, by the ME, encrypted information from the online bill payment service without a client application accessing the information in unencrypted form.

21. The non-transitory storage media of claim 19, wherein the operations further include sending, by the ME, the encrypted payment instructions to the online payment bill service without a client application accessing the information in unencrypted form.

* * * * *